United States Patent
Gallo et al.

(10) Patent No.: US 6,473,706 B1
(45) Date of Patent: Oct. 29, 2002

(54) SELF-CONFIGURING AND SELF-CALIBRATING AUTOMATED SYSTEM

(75) Inventors: Frank David Gallo; Brian Gerard Goodman; Leonard George Jesionowski; Staley Bert Slawson; Roberta Lee Winston; Raymond Yardy, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 09/611,446

(22) Filed: Jul. 6, 2000

(51) Int. Cl.[7] ............................................. G01L 23/16
(52) U.S. Cl. ................................. 702/105; 369/30.31
(58) Field of Search ............................... 700/214, 215; 702/105; 369/30.31

(56) References Cited

U.S. PATENT DOCUMENTS

| | | | |
|---|---|---|---|
| 5,012,415 A | 4/1991 | Boe et al. ............... 364/424.07 |
| 5,311,424 A | 5/1994 | Mukherjee et al. ......... 364/401 |
| 5,323,327 A * | 6/1994 | Carmichael et al. ........ 235/383 |
| 5,402,101 A | 3/1995 | Berger et al. .......... 340/286.02 |
| 5,426,581 A * | 6/1995 | Kishi et al. .................. 235/383 |
| 5,426,585 A | 6/1995 | Stepper et al. ......... 364/424.03 |
| 5,450,385 A * | 9/1995 | Ellis et al. ................... 235/385 |
| 5,646,918 A | 7/1997 | Dimitri et al. ................ 369/34 |
| 5,826,043 A | 10/1998 | Smith et al. ................ 395/281 |
| 5,970,147 A | 10/1999 | Davis .......................... 380/25 |
| 5,980,078 A | 11/1999 | Krivoshein et al. ......... 364/131 |
| 6,115,648 A * | 9/2000 | Gallo ......................... 700/214 |
| 6,205,093 B1 * | 3/2001 | Abbott et al. ................. 360/92 |

* cited by examiner

Primary Examiner—Marc S. Hoff
Assistant Examiner—Edward Raymond
(74) Attorney, Agent, or Firm—John H. Holcombe

(57) ABSTRACT

An automated system having removable system components is self-configured, first, determining whether configuration data is available, for example, in a non-volatile memory. If available, the processor reads a system identifier of the configuration data, compares the read and a sensed system identifier, and, if they match, ends the self-configuration. Otherwise, the system senses the removable system components, configuring the system. A sensor is moved to sense the presence or absence each of the removable system components at substantially the expected location of the component. The system operates a movable sensor to calibrate a relative position with respect to the calibration mark.

31 Claims, 7 Drawing Sheets

SELF-CONFIGURING AND SELF-CALIBRATING AUTOMATED SYSTEM

FIELD OF THE INVENTION

This invention relates to automated systems, such as systems employing sensors and actuators, and, more particularly, to automated systems having removable system components that must be configured and their locations calibrated.

BACKGROUND OF THE INVENTION

The typical automated system employing removable system components, such as an automated data storage library, requires a complicated process with operator intervention for setting up the hardware, configuring the hardware devices, and calibrating the precise locations of the hardware, so that an actuator or device that interacts with the hardware devices can interact at the correct locations.

For example, operator intervention may be required to introduce any change to the automated system, such as upon the addition, removal or exchange of any components. Once the operator defines the changes to the configuration, or defines the system as changed, some calibration may then occur automatically. However, the calibration is an extensive process in itself, so that to allow a system to re-calibrate automatically, for example, at each power on, would result in repeating the extensive process when not actually required, wasting time and reducing the efficiency and productivity of the automated system. As an example, U.S. Pat. No. 5,012,415 provides some calibration of the ranges of installed sensors and disables configurable features if the sensors are not present, but requires manual intervention to initiate the process.

Operator intervention is also required if a processor for the automated system is changed, for example, in a repair action, so that the operator may define the system for the new processor or so that the processor may receive the configuration information from the operator and conduct any calibration and then load the information in the memory. Further, a qualified operator may be required to intervene if the software for the processor is updated, and the system will undergo a reconfiguration and recalibration, even if the components of the system are unchanged. The requirement that a qualified operator be present limits the timing of any upgrade, and could prove to be of concern if an emergency action were required.

Electronic sensing of new electronically coupled components is known in the art, but does not indicate the mechanical location of those components. As an example, U.S. Pat. No. 5,980,078 describes a process of detecting and configuring digital devices on a network, requiring "smart" devices. Additionally, it is possible to determine the number of frames or the size of the automated system by testing the length of the cables employed in the system. However, many variably sized systems come with the longest possible cables, so that the system does not have to be recabled when the system size is changed. Hence, the current art requires that an operator indicate the new configuration and initiate any calibration.

Additionally, the processor may require rebooting due to various circumstances at much shorter intervals than changes are made to the removable components of the automated system. Hence, to require operator intervention to again configure an already configured system, and then to recalibrate that system would be wasteful and inefficient.

As a result, even in a reboot or upgrade action to the processor, or in a repair or replacement of the processor, or of a single removable component, the operator must be available and have knowledge of the system in order to properly characterize the system configuration and to initiate any calibration, reducing the efficiency of the operator, and substantially reducing the availability and efficiency of the automated system, especially in the absence of a qualified operator.

SUMMARY OF THE INVENTION

It is an object of the present invention to prevent configuration of an already properly configured and calibrated system.

It is another object of the present invention to provide self-configuring and self-calibration capability to an automated system without requiring the intervention of an operator to provide configuration information.

Disclosed are a self-configuring and self-calibrating automated system and method, the automated system having removable system components. The automated system first determines whether configuration data is available, for example, in a non-volatile memory of a processor. If the configuration data is available, the processor reads a system identifier of the configuration data, the automated system senses a system identifier of the automated system, which may be mounted on a frame of the automated system, the processor compares the read and the sensed system identifiers, and, if the compared system identifiers match, ends the self-configuration. If, however, the configuration data is not available, or the system identifier comparison step fails, the automated system senses the removable system components, configuring the system.

The movable sensor may move on a rail that extends from one frame into any additional frame. The automated system may move the movable sensor to a maximum available distance along the rail and into any additional frame, for example, until encountering a stop. The system processor, in conducting the self-configuration, determines the maximum available distance along the rail, and determines the number of frames from the maximum available distance.

The removable system components are located at expected locations of the automated system, and have calibration marks. The automated system comprises at least one movable sensor, and the automated system moves the movable sensor to sense the presence or absence of each of the removable system components at substantially the expected location of the removable system component. Subsequently, the automated system operates a movable sensor to calibrate at least one relative position of the movable sensor with respect to the calibration mark.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
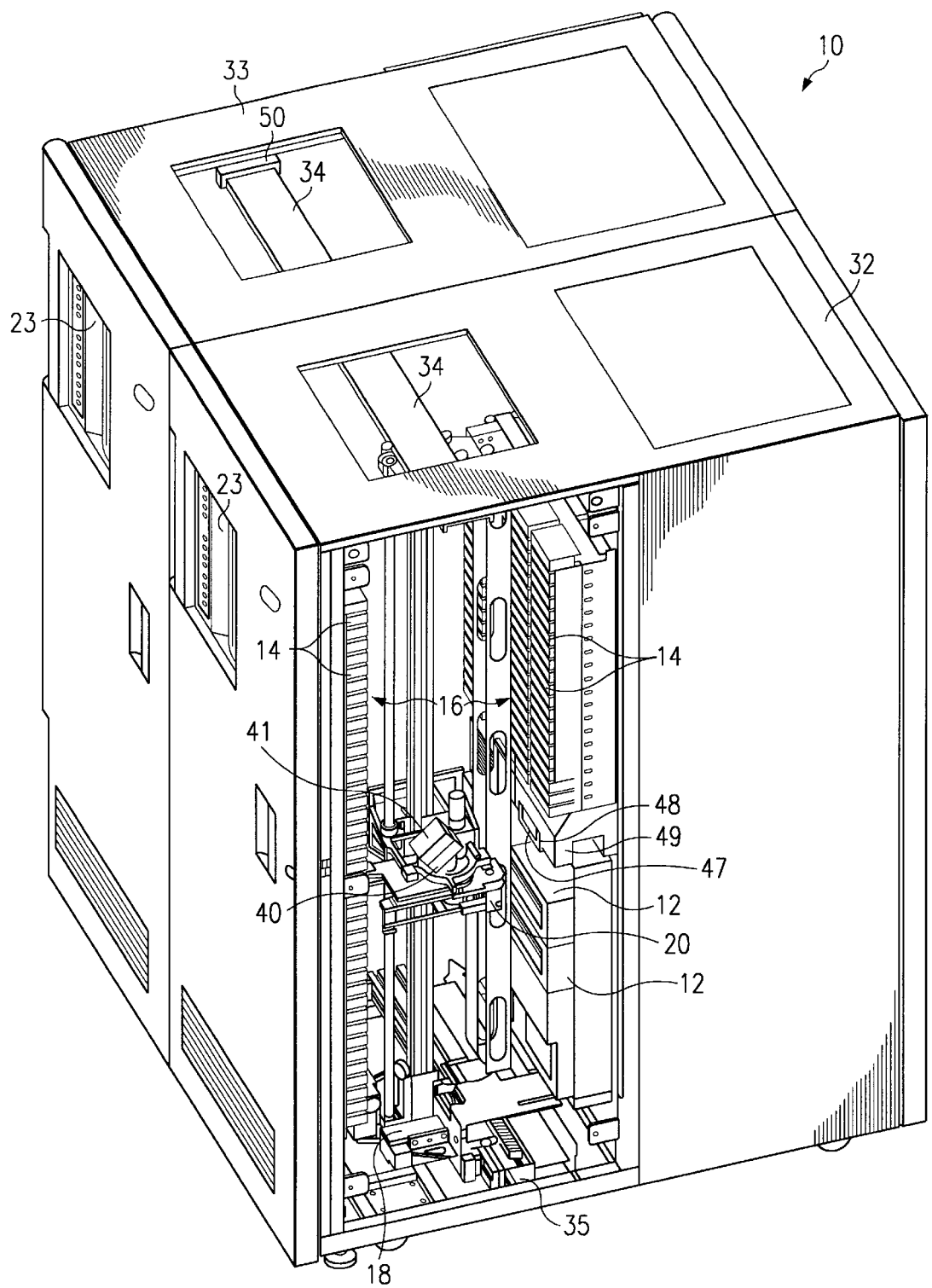
FIG. 1 is a perspective view of an embodiment of a self-configuring and self-calibrating automated system in accordance with the present invention.
Figure 2:
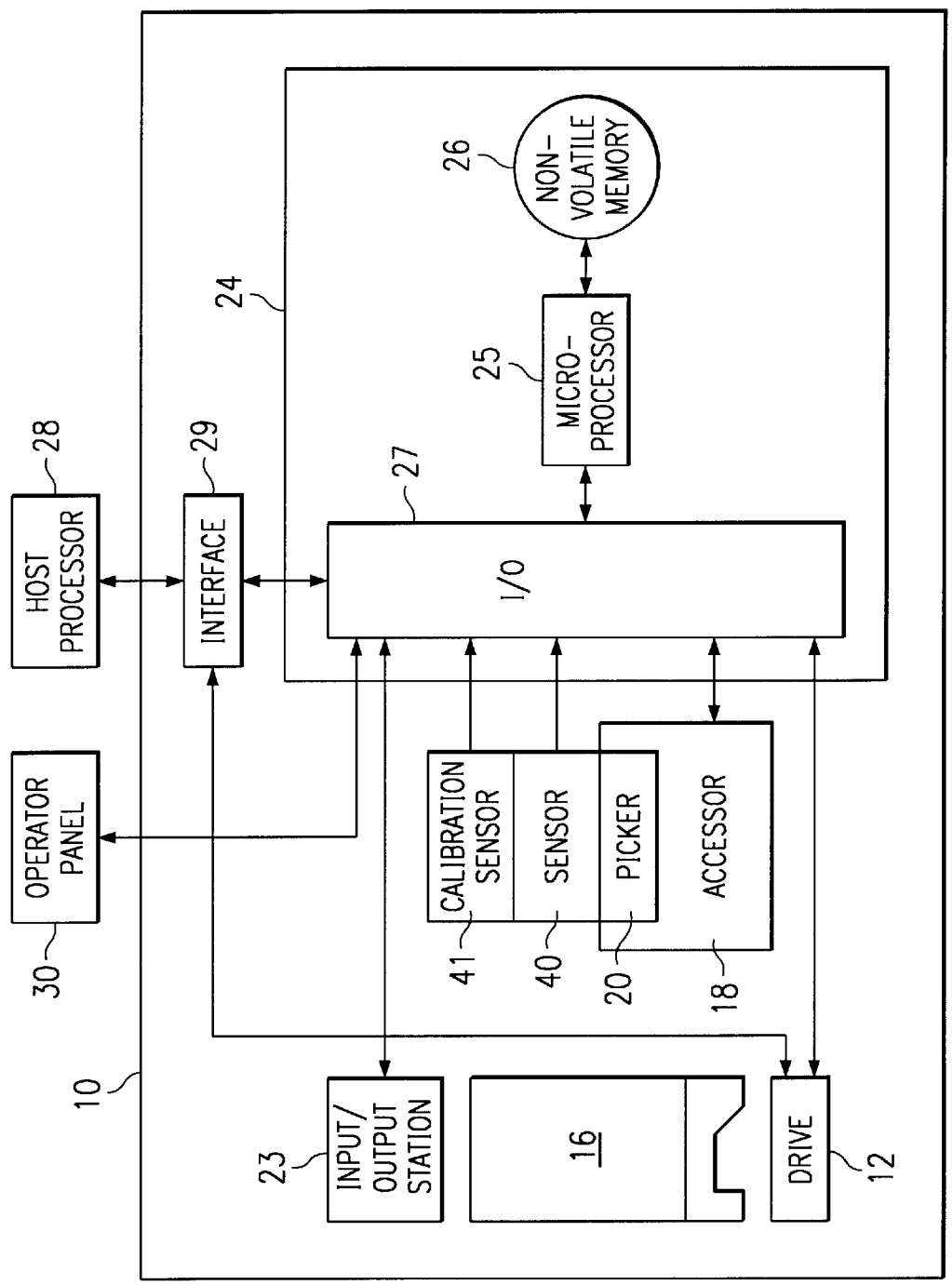
FIG. 2 is a block diagram of the automated system of FIG. 1.

Referring to FIGS. 1 and 2, an embodiment of an automated system 10 is illustrated which is self-configuring and self-calibrating. The present invention is applicable to any automated system having at least one movable sensor, and is advantageously employed in automated systems having removable components and an actuator which interacts with one or more of the removable components, requiring configuration and/or calibration of the automated system to allow that interaction.

The specific automated system illustrated in FIGS. 1 and 2 is an automated data storage library which comprises one or more removable data storage drives 12, for example, for reading and/or writing on data storage media 14, such as magnetic tape cartridges. In the instant example, a plurality of data storage media 14 are stored in banks of storage shelves 16. An accessor 18 and picker 20 comprise an actuator which interacts with the data storage drives 12 and the storage shelves 16, and transports data storage media 14 amongst the data storage drives and the storage shelves. An example of an automated system which may implement the present invention is the IBM 3494 Data Storage Library, which stores magnetic tape cartridges.

A controller 24 is provided which may comprise at least one microprocessor 25, including a non-volatile memory device 26, such as a disk drive, and input/output circuits or adapters 27, such as serial ports or register I/O. In the example of an automated data storage library, the library controller 24 may comprise any suitable microprocessor or workstation, such as an IBM RS/6000 processor. The memory device 26 stores programs and information which cause the controller to operate the library, such as configuration and calibration data for the library. The controller is coupled with, and controls the operation of, the accessor 18 and picker 20, and may interface with the data storage drives 12. The controller may be coupled to one or more input/output stations 23, which allow the transfer of data storage media 14 into and out of the library. The controller 24 is further coupled to an operator panel 30, and is also coupled to a host system 28, typically via an interface 29, such as SCSI ports. The controller 24 receives access commands from the host system 28 for the selection and transport of cartridges 14 amongst storage shelves 16, data storage drives 12 and input/output stations 23. The host system 28 may be coupled to the drives 12, and information to be recorded on, or to be read from, selected data storage media 14 is transmitted between the drives and the host system.

Automated systems, such as the exemplary automated data storage library 10, typically are updated or expanded, or require repair actions, involving the addition or replacement of removable components. As discussed above, operator intervention may be required to introduce any change to the automated system, such as upon the addition, removal or exchange of any components. Once the operator defines the changes to the configuration, or defines the system as changed, some calibration may then occur automatically. However, the calibration is an extensive process in itself, so that to allow a system to re-calibrate automatically, for example, at each power on, would result in repeating the extensive process when not actually required, wasting time and reducing the efficiency and productivity of the automated system.

A key component which is often updated is the controller 24 or one or more of its elements, including its programming. Additionally, the controller or its microprocessor 25 may require rebooting due to various circumstances at much shorter intervals than changes are made to the removable components of the automated system. Hence, to require operator intervention to again configure an already configured system, and then to recalibrate that system would be wasteful and inefficient.

Examples of removable components comprise each bank of storage shelves 16, each data storage drive 12, and each input/output station 23. Other changes that may be made comprise the addition or removal of one of the frames 32 or 33, changing the length of the system. In the example of an automated data storage library, a rail, for example, comprising top and bottom rails 34 and 35, respectively, extend the length of travel of the accessor 18 from frame 32 and into frame 33. In one example, an automated data storage library may comprise from one to sixteen frames.

Thus, any configuration of the automated system must determine the number of frames, and must determine each of the removable components that comprises the system, at the time of the configuration.

The present invention provides self-configuring and self-calibration capability to an automated system without requiring the intervention of an operator. The self-configuration and self-calibration may be initiated by an operator at the installation, removal, or exchange of a removable component or a frame, or may be initiated by the change of the processor 25 and/or of its non-volatile memory 26, or upon a change or reboot of the processor or its software, or periodically.

Still referring to FIGS. 1 and 2, the automated system first determines whether configuration data is available, for example, in the non-volatile memory 26 of the processor 25. For example, even though the processor 25 or its software may be changed or rebooted, the non-volatile memory 26 may remain unchanged. Alternatively, the non-volatile memory may have been changed, while the processor is unchanged.

If the configuration data is not available at the non-volatile memory 26, the automated system self-configures the system. Absence of configuration data may indicate that the non-volatile memory 26 has been changed or altered, either separate from, or simultaneous with, a change to the processor 25, for example, in a repair action. Alternatively, the system may be altered, and the operator will cause the processor to delete the configuration data, forcing the self-configuration. In accordance with the present invention, the operator is not required to provide the configuration data, but rather may only delete the configuration file.

Figure 3:
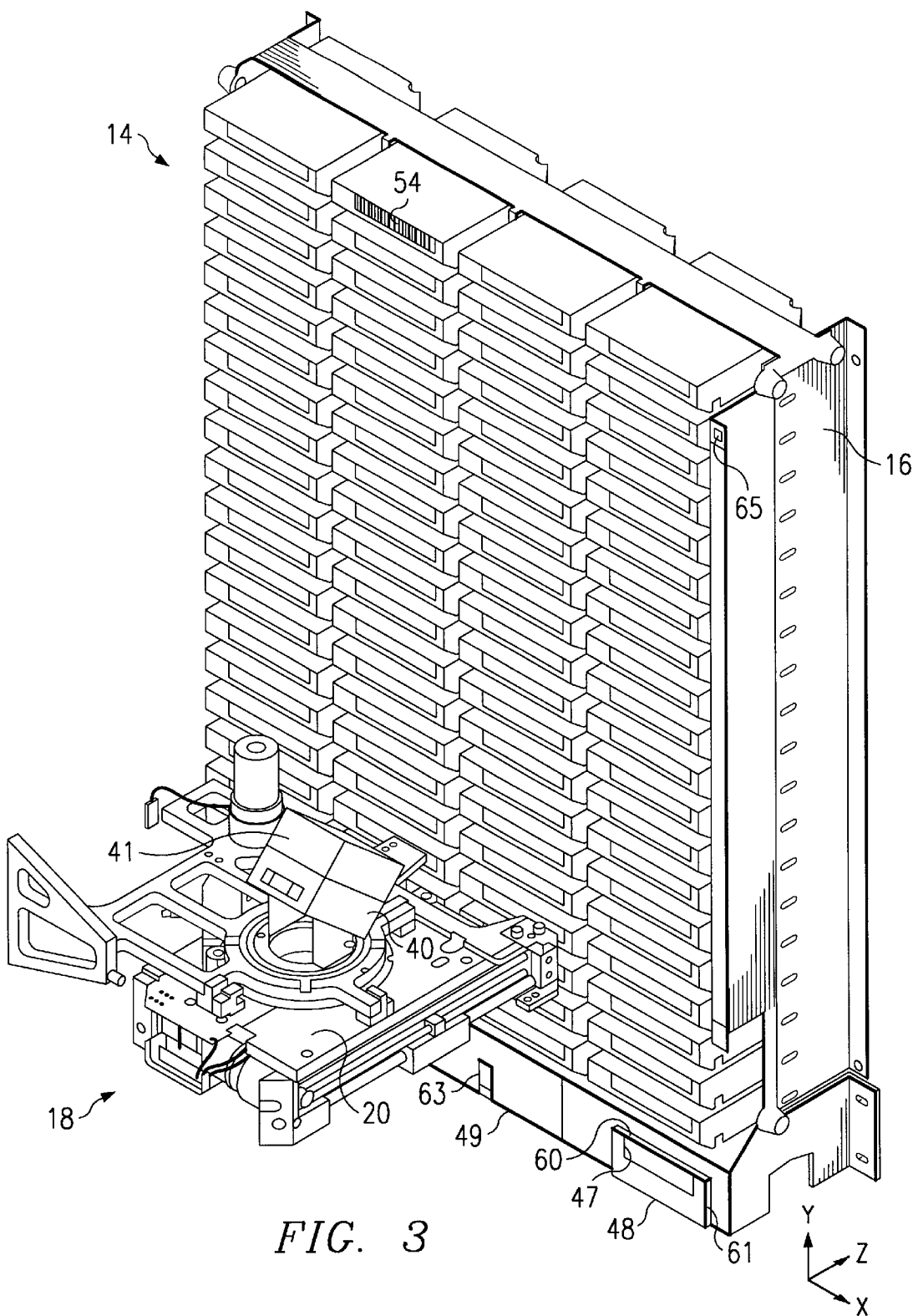
FIG. 3 is an illustration of movable sensors and an actuator in proximity to a system identifier and calibration mark, and a bank of removable storage shelves of FIG. 1.

Referring additionally to FIG. 3, the accessor 18 additionally carries one or more movable sensors 40 and 41, for example, mounted on the picker 20. The accessor and picker, comprising the automated system actuator, may provide the movement capability for the movable sensors 40 and 41. In the instant embodiment, one of the sensors 40 senses the removable components, and the other one of the sensors 41 provides a directional capability for calibration. Sensor 40 may be able to read sensible indicators, for example, a bar code reader, and/or may be able to sense the presence or absence of a removable component by detecting the reflection from a surface of the removable component. The calibration sensor 41 comprises a directional sensor, for example, a low power laser or LED, which may be moved precisely to make exacting calibration measurements, for example, by the actuator, accessor 18 and picker 20, or having coarse movement by the actuator and fine movement by the calibration sensor beam.

Figure 4:
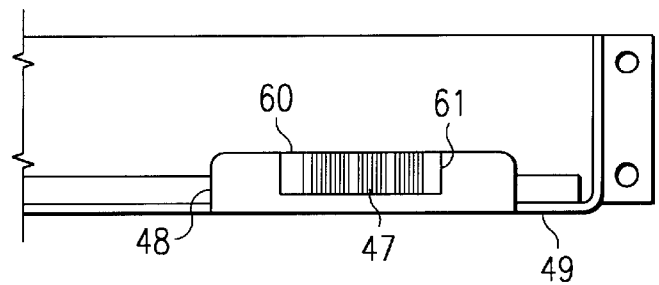
FIG. 4 is an illustration of the system identifier of FIG. 3.

In accordance with the present invention, additionally referring to FIG. 4, a system identifier 47 mounted at a predetermined one of the frames, for example, by means of a mounting plate 48 on a bracket 49 fixed to the frame such that the system identifier 47 is at a predetermined location on the frame.

Thus, if the configuration data is available, for example, in non-volatile memory 26 of FIG. 2, the processor 25 reads the system identifier from the configuration data. Then, the automated system operates the movable sensor 40 of FIG. 3 to move to the predetermined location of the system identifier 47 mounted on the frame 32 of the automated system, and to sense the system identifier of the automated system. The processor 25 then compares the read and the sensed system identifiers, and, if the compared system identifiers match, ends the self-configuration.

If the compared system identifiers match, self-configuration is not conducted. In this manner, the present invention prevents configuration of an already properly configured and calibrated system. Therefore, the software may allow for a check of the system identifiers at any reboot to insure that any change to the processor has not resulted in a change to the configuration data.

If, however, the configuration data is not available, or the system identifier comparison fails, the automated system senses the removable system components, configuring the system. Additionally, the operator may initiate the self-configuration, and will not have to be a specially qualified operator, and may initiate the self-configuration if an emergency action were required.

Referring to FIG. 1, the rail 34, 35 is provided with a stop 50 at the end of travel of the accessor 18 in the frame furthest from the home station, if any, of the accessor. For example, the stop may be located in frame 33. The stop performs the valuable function of preventing the accessor from running into the end of the frame 33 and possibly suffering damage. Frame 32 may also be provided with a stop to prevent the accessor from running into the close end of the frame.

Then, in accordance with the present invention, as part of the self-configuration, the processor 25 of FIG. 2 operates the accessor 18 to move the movable sensor to a maximum available distance along the rail 34, 35 and into any additional frame 33, for example, until encountering the stop 50. The system processor determines the maximum available distance along the rail, and determines the number of frames 32, 33 from the maximum available distance.

In accordance with the present invention, and referring to FIGS. 1–3, the removable system components are located at expected locations of the automated system. In the instant example, removable system components may comprise each bank of storage shelves 16, each data storage drive 12, and each input/output station 23. As discussed above, the automated system 10 comprises at least one movable sensor 40, and the processor 25 operates the accessor 18 to move the movable sensor to sense the presence or absence of each of the removable system components at substantially the expected location of the removable system component. The sensor 40 may sense the presence or absence of a removable component by detecting, e.g., the reflection of a sweeping beam from a surface of the removable component. Alternatively, the sensor 41 may be employed to generate a beam and detect the reflection. The removable components may comprise groups, such as a group of data storage drives 12, so that reading the reflection from one will indicate that the group is present. Thus, herein, the sensing of a removable component may include the sensing of a group by sensing one of the group.

Alternatively, or additionally, the sensor 40 may be able to read sensible indicators, for example, a bar code reader, and may sense the presence or absence of a removable component by reading the sensible indicator or bar code of the removable component. This allows different removable components to occupy similar expected locations.

Figure 5:
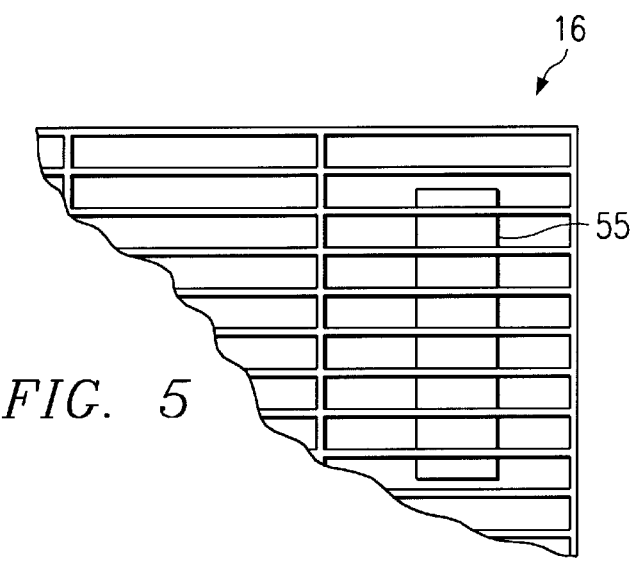
FIG. 5 is an illustration of the bank of storage shelves of FIG. 3, which is illustrated as empty.
Figure 6:
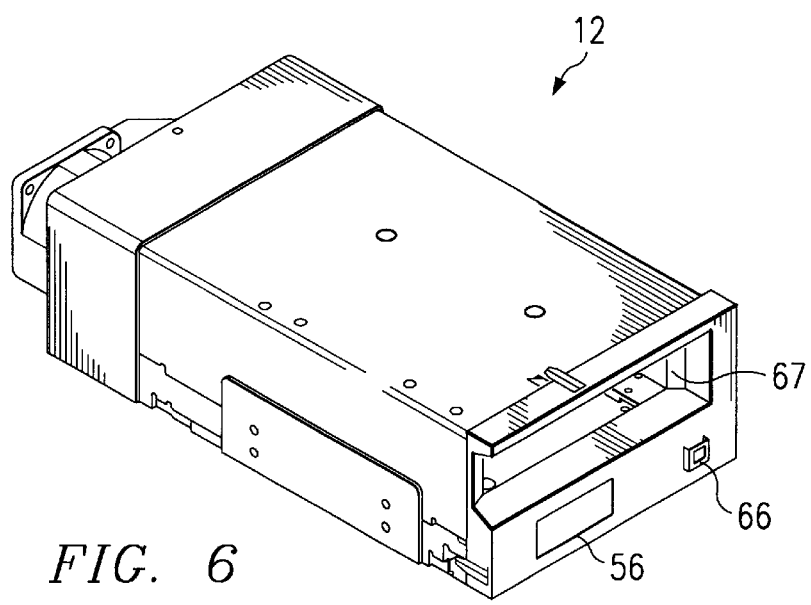
FIG. 6 is an illustration of a removable data storage drive of FIG. 1.
Figure 7:
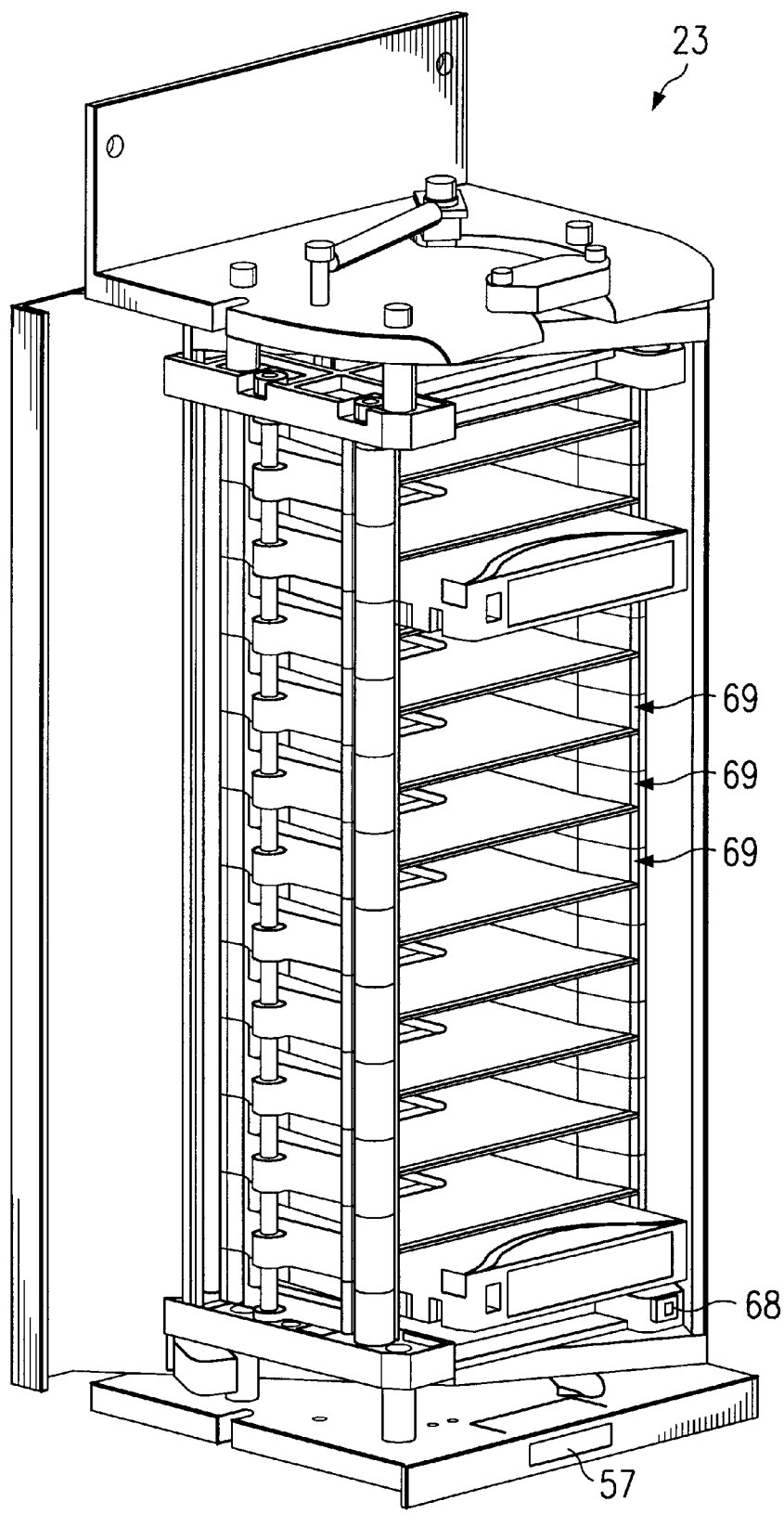
FIG. 7 is an illustration of a removable input/output station of FIG. 1.

Examples of removable system components having sensible indicators are illustrated in FIGS. 5–7. FIG. 5 illustrates the bank of storage shelves 16 of FIG. 3, and is illustrated as empty. The back of the bank of storage shelves is provided with an extended sensible indicator 55, such as a bar code label. Thus, the movable sensor 40 of FIG. 1 is moved to the location of the sensible indicator 55, and, if the storage shelf examined by the movable sensor is empty, the sensor will read the sensible indicator 55. On the other hand, if the storage shelf examined by the movable sensor is occupied by a data storage media 14, such as is illustrated in FIG. 3, the sensor will read the sensible indicator, for example, bar code label 54 of the data storage media 14. In either case, the processor 25 will be able to determine that the bank of storage shelves 16 is located at the expected location.

FIG. 6 is an illustration of a removable data storage drive 12 of FIG. 1. A sensible indicator 56, such as a bar code label, is provided at the front of the data storage drive. Thus, the movable sensor 40 of FIG. 1 is moved to the expected location of the sensible indicator 56 of the data storage drive 12, and, upon sensing the sensible indicator, the processor 25 of FIG. 2 will be able to determine that the data storage drive is located at the expected location.

FIG. 7 is an illustration of a removable input/output station 23 of FIG. 1. A sensible indicator 57, such as a bar code label, is provided at the front of the input/output station 23. Thus, the movable sensor 40 of FIG. 1 is moved to the expected location of the sensible indicator 57 of the input/output station 23, and, upon sensing the sensible indicator, the processor 25 of FIG. 2 will be able to determine that the input/output station is located at the expected location.

Referring to FIGS. 3 and 4, the fixed bracket 49 provides a means to calibrate the positional relationship of the calibration sensor 41 and actuator with respect to the frame. In the illustrated example, the picker 20 must be positioned precisely with respect to the removable system components in order to reliably pick and place the data storage media 14. The accessor 18 moves horizontally on the rail 34, 35, which is fixed with respect to the frame, and the accessor 18 positions the picker 20 in the vertical direction, both movements tracked by the processor 25 of FIG. 2. Additionally, the positional relationship between the picker 20 and the calibration sensor 41 is known. Specifically, the calibration sensor may be fixed, or its movement with respect to the picker is controlled by the processor 25, so that the processor may determine the positional relationship. Hence, a calibration mark, or marks, on the bracket 49 provides a positional relationship with respect to the frame, and the processor provides the positional relationship with respect to the rail, so that the processor may employ the positional relationship of the calibration sensor 41 to the calibration mark of the bracket 49 to determine the positional relationship between the picker 20 and the calibration mark.

The removable system components are located at expected locations of the automated system, and have calibration marks. Thus, the processor, employing known positional relationships between the calibration marks and the location of the functional interaction of the picker 20 with the removable component, may determine the precise location of the functional interaction point of the removable component for the picker. The processor 25 of FIG. 2 is therefore able to properly position the picker at each removable component to reliably pick and place the data storage media 14. In an alternative embodiment, the calibration mark may be employed to provide the reflection, etc., for the detection of the presence of the removable component.

One of two alternative embodiments of calibration marks is illustrated in FIGS. 3 and 4. Specifically, in one embodiment, top edge 60 of mounting plate 48 on the bracket 49 is precisely located in the vertical Y direction, providing the vertical calibration, and either the bar code label 47, or an edge 61 of the mounting plate 48, is precisely positioned horizontally in the X direction, or, alternatively, in both the X and Z directions, providing the horizontal calibration. Both the horizontal and vertical positions of the calibration mark must be known to the processor 25 of FIG. 2 with respect to the rail or to the accessor 18, in order to provide the calibration.

Alternatively, a calibration mark 63 of FIG. 3, is precisely positioned on the fixed bracket 49, and provides both horizontal and vertical calibration, as discussed above.

Each of the removable components that interacts with the picker 20 of FIG. 2 is provided with a calibration mark.

Referring to FIG. 3, a calibration mark 65 is provided which has a fixed positional relationship with respect to each of the storage shelves of the bank of storage shelves 16. Referring to FIG. 6, a calibration mark 66 is provided which has a fixed positional relationship with respect to the media opening 67 in the data storage drive 12. Referring to FIG. 7, a calibration mark 68 is provided which has a fixed positional relationship with respect to each of the media openings 69 in the input/output station 23.

Referring to FIGS. 1–8, the automated system, by moving the accessor 18 and the picker 20, moves the movable calibration sensor 41 to calibrate at least one relative position of the movable sensor, and therefore the picker 20, with respect to the calibration mark 60, 61 or 63. Then, the automated system moves the movable calibration sensor 41 to the calibration mark of each of the configured removable components to calibrate the positional relationship of the picker 20 with respect to the component, and specifically the point of interaction between the component and the picker. Thus, the calibration sensor detects the position of each of the calibration marks, and the processor determines the position of the picker required to properly interact with the component. As examples, the calibration sensor detects the position of calibration mark 65 of the bank of storage shelves 16, the position of calibration mark 66 of the data storage drive 12, and the position of the calibration mark 68 of the input/output station 23. The processor 25 may then determine the positional relationship of the picker 20 with respect to each of the storage shelves of the bank of storage cells 16, the positional relationship of the picker with respect to the media opening 67 in the data storage drive, and the positional relationship of the picker with respect to each of the media openings 69 in the input/output station.

Alternative arrangements of the removable components, the movable sensors, and the sensible indicators and calibration marks of the removable components may be envisioned by those of skill in the art.

Figure 8:
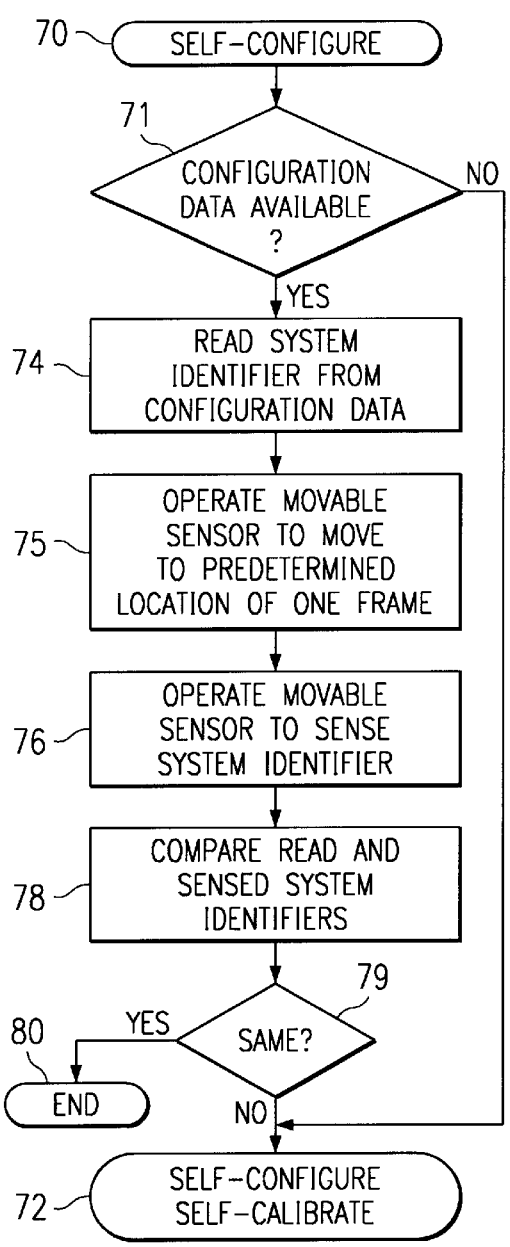
FIGS. 8, 9 and 10 are flow charts depicting an embodiment of the method of the present invention.
Figure 10:
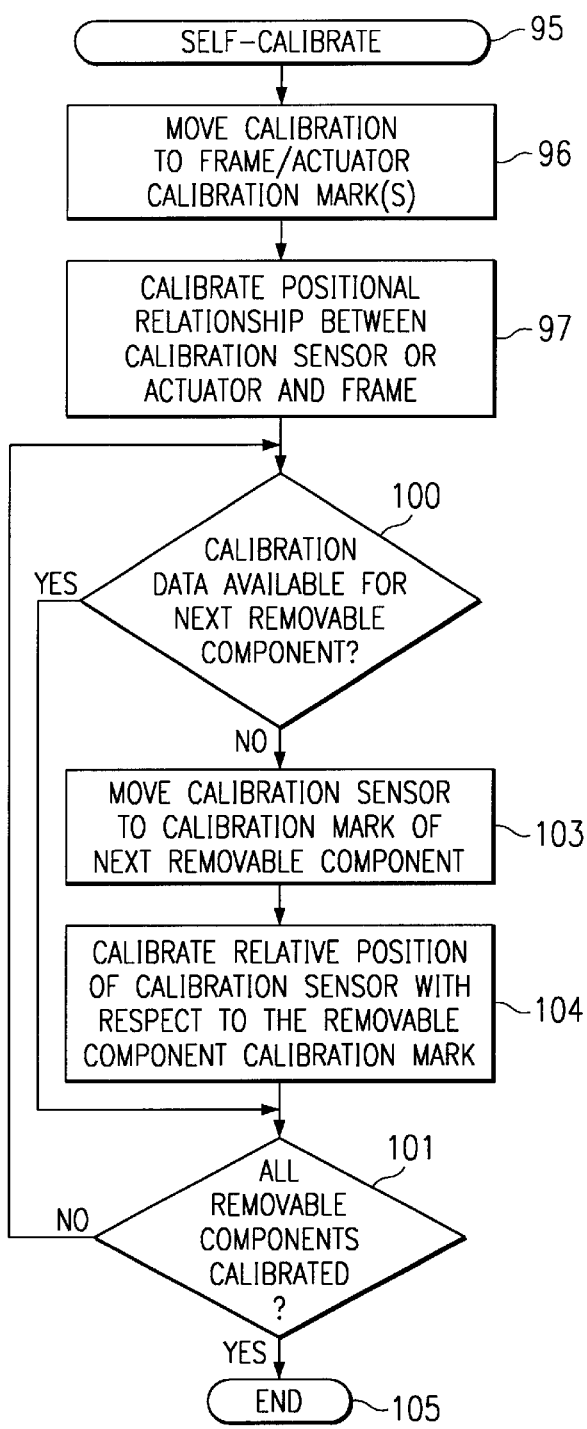
Figure 9:
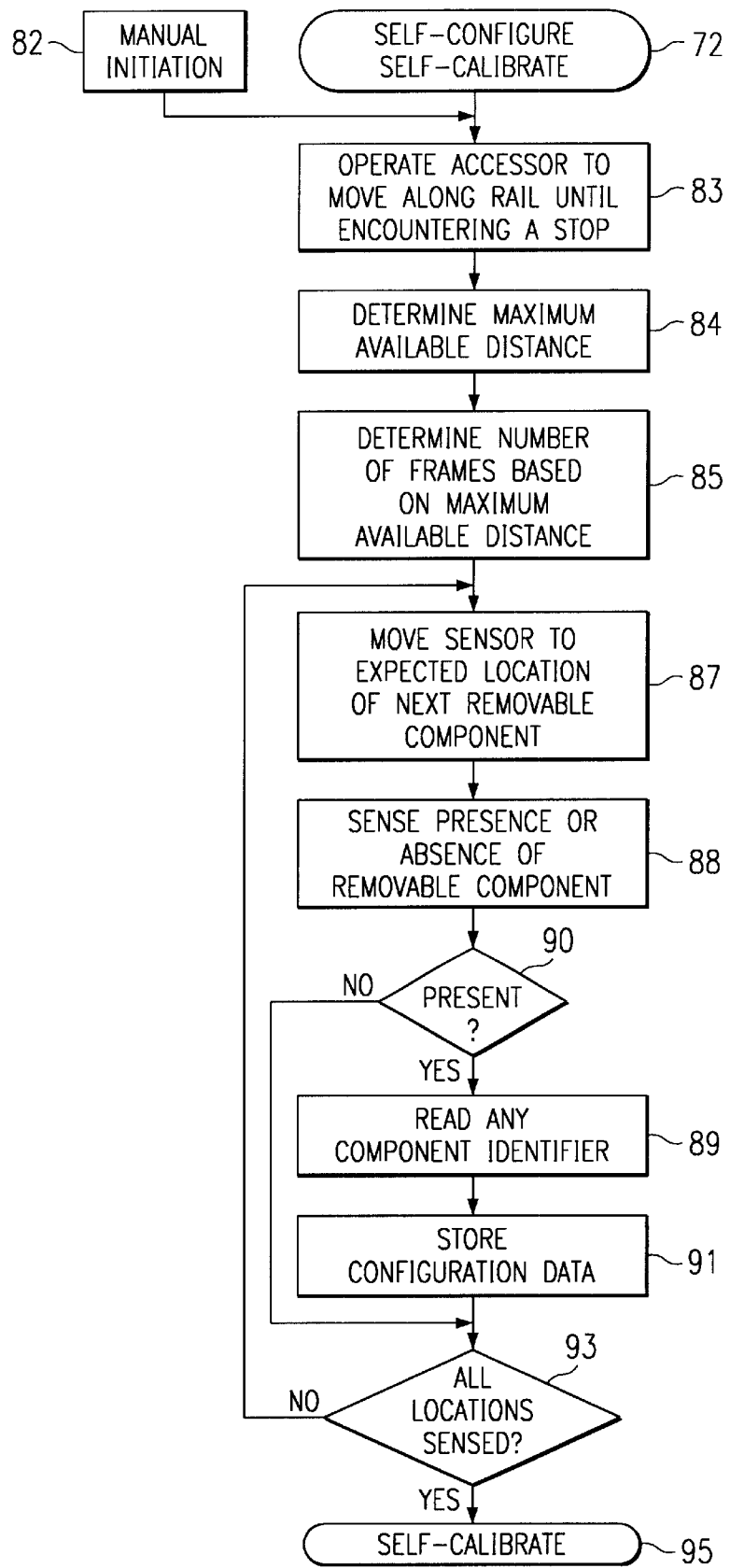

FIGS. 8–10 depict an embodiment of the method of the present invention. Referring to FIGS. 1–4 and 8, the self-configuration begins at step 70. In step 71, the automated system determines whether configuration data is available, for example, in the non-volatile memory 26 of the processor 25. If no configuration data is available, "NO", the self-configuration and self-calibration are conducted as illustrated by step 72. Hence, if a change is made to the removable components or to the frame, the configuration data may be deleted, which is a relatively simple operation, and the self-configuration will be conducted.

If configuration data is available, "YES", the present invention provides an assurance that it is the correct configuration data. Hence, in step 74, the processor 25 reads the system identifier from the configuration data, for example, in non-volatile memory 26. Then, in step 75, the automated system operates the movable sensor 40 to move to the predetermined location of the system identifier 47 mounted on the frame 32 of the automated system, and, in step 76, operates the movable sensor to sense the system identifier of the automated system. The processor 25 then, in step 78, compares the read and the sensed system identifiers, and, if, in step 79, the compared system identifiers match, ends the self-configuration as illustrated in step 80.

If the compared system identifiers match, self-configuration is not conducted. In this manner, the present invention prevents configuration of an already properly configured and calibrated system. If, however, step 79 indicates that the compared system identifiers do not match, the self-configuration and self-calibration will be conducted in accordance with step 72. Thus, if a change is made to the removable components or to the frame, either the system identifier stored in the non-volatile memory 26 or the system identifier of the sensible identifier 47 may be changed, and the self-configuration will be conducted.

Referring to FIGS. 1–7 and 9, the self-configuration and self-calibration begins at step 72 as initiated by the processor 25 as shown by the method of FIG. 8. Alternatively, the self-configuration may be initiated by an operator at step 82. No further intervention, nor further information, is required from the operator.

In step 83, the automated system, employing processor 25, operates the accessor 18 to move the movable sensor to a maximum available distance along the rail 34, 35 and into any additional frame 33, for example, until encountering the stop 50. In step 84, the system processor determines the maximum available distance along the rail, and, in step 85, determines the number of frames 32, 33 from the maximum available distance.

As discussed above, the removable system components are located at expected locations of the automated system. In step 87, the processor 25 operates the accessor 18 to move the movable sensor 40, 41 to substantially the expected location of the removable system component. Then, in step 88, the processor 25 operates the movable sensor 40, 41 to sense the presence or absence of the removable system component. If the removable component is present, as indicated in step 90, sensor 40 reads the sensible indicator or bar code of the removable component in step 89. As discussed above, the sensor 40, 41 may sense the presence or absence of a removable component in step 88 by detecting the reflection from a surface of the removable component, or, alternatively, or additionally, sensor 40 may sense the presence or absence of a removable component by reading the sensible indicator or bar code of the removable component, in effect combining step 88 and step 89. If the removable component is present, as indicated in step 90, the automated system then, in step 91, stores the configuration data that was sensed in step 89 for the removable component, for example, in the non-volatile memory 26. After storing the configuration data, or if no component was at the checked location, the automated system determines, in step 93, whether all possible locations of removable components have been sensed. If not all locations have been sensed, the process cycles back to step 87 to move the sensor 40, 41 to the expected location of the next removable component.

Once step 93 indicates that all locations have been sensed, step 95 leads to self-calibration in FIG. 10. Referring to FIGS. 1–7 and 10, the automated system, in step 96, moves the accessor to the calibration mark(s) fixed with respect to the frame, such as the calibration mark 60, 61 or 63 at fixed bracket 49, to calibrate the positional relationship of the calibration sensor 41 and actuator, such as the accessor 18 and picker 20, with respect to the frame, in step 97. As discussed above, in the illustrated example, the picker 20 must be positioned precisely with respect to the removable system components in order to reliably pick and place the data storage media 14 at the various removable components.

The removable system components are located at expected locations of the automated system, and have calibration marks. Thus, the processor, employing known positional relationships between the calibration marks and the location of the functional interaction of the picker 20 with the removable component, may determine the precise location of the functional interaction point of the removable component for the picker. The processor 25 is therefore able to properly position the picker at each removable component to reliably pick and place the data storage media 14.

The calibration data for a removable component may already be available, for example, if not all of the removable components have been changed. Thus, in step 100, the automated system determines, employing the processor 25, whether the calibration data is available for the next removable component. If it is available, the calibration need not be repeated. Hence, the process moves to step 101 to determine whether all of the removable components in the system have been calibrated. If not, "NO", the process cycles back to step 100.

If, in step 100, the calibration data is not available, the automated system, in step 103, moves the movable calibration sensor 41 to the calibration mark of next one of the configured removable components, and, in step 104, calibrates the positional relationship of the picker 20 with respect to the component, and specifically, as discussed above, the point of interaction between the component and the picker. Then, the process moves to step 101 to determine whether all of the removable components in the system have been calibrated. If not, "NO", the process cycles back to step 10Q. Once the positions of all of the removable system components have been calibrated, "YES" in step 101, the self-configuration and self-calibration processes have been completed, as indicated by step 105.

Those of skill in the art will understand that the steps of FIGS. 8–10 may be reordered and that equivalent steps may be employed.

Thus, the present invention prevents configuration of an already properly configured and calibrated system, and provides self-configuring and self-calibration capability for an automated system without requiring the intervention of an operator to provide configuration information.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for self-configuring an automated system having a plurality of removable system components, comprising the steps of:

said automated system determining whether configuration data is available;

if said configuration data is available:

reading a system identifier of said configuration data;

said automated system sensing a system identifier of said automated system;

comparing said read and said sensed system identifiers; and if said compared system identifiers match, ending said self-configuration; and if any of said configuration data availability determination step, and said system identifier comparison step, fails, said automated system senses said removable system components, thereby configuring said automated system.

2. The method of claim 1, wherein said removable system components are located at expected locations of said automated system, and said automated system comprises a movable sensor; and wherein said step of said automated system sensing said removable system components comprises said automated system moving said movable sensor to sense the presence or absence of said removable system components at substantially said expected locations of said removable system components.

3. The method of claim 1, wherein said automated system comprises at least one frame for mounting said removable system components, said frame additionally mounting said system identifier of said automated system, and said automated system comprises a movable sensor; and wherein said step of said automated system sensing said system identifier comprises said automated system moving said movable sensor to sense said system identifier at said frame.

4. The method of claim 3, wherein said movable sensor moves on a rail, which rail extends from one frame into any additional frame; and wherein said method additionally comprises the steps of:

moving said movable sensor to a maximum available distance along said rail and into any additional frame;

determining said maximum available distance; and determining from said maximum available distance, the number of said frames.

5. The method of claim 4, wherein said automated system comprises a plurality of said frames; and wherein said step of said automated system sensing said system identifier comprises said automated system moving said movable sensor to a predetermined location at a predetermined one of said frames to sense said system identifier.

6. A method for self-configuring an automated system having a plurality of removable system components, wherein said removable system components are located at expected locations of said automated system, and each comprises a sensible identifier at said removable system component, and said automated system comprises a movable sensor, comprising the steps of:

said automated system moving said movable sensor to substantially said expected locations of said removable system components; and sensing said sensible identifiers at said expected locations, thereby sensing said removable system components, configuring said automated system.

7. The method of claim 6, wherein at least one of said removable system components comprises a calibration mark, and said automated system comprises a movable calibration sensor; and wherein said method additionally comprises, subsequent to said step of said automated system sensing said removable system components, said automated system operating said movable calibration sensor to calibrate at least one relative position of said movable calibration sensor with respect to said calibration mark.

8. The method of claim 7, wherein said automated system additionally comprises a movable actuator for interacting with respect to said at least one removable system component having a calibration mark; and wherein said method additionally comprises the step of calibrating a position relationship between said movable actuator and said movable calibration sensor, whereby said calibration of said movable calibration sensor with respect to said calibration mark allows accurate alignment between said movable actuator and said at least one removable system component.

9. The method of claim 6, wherein said movable sensor moves on a rail, which rail extends from one frame into any additional frame; and wherein said method additionally comprises the steps of:

moving said movable sensor to a maximum available distance along said rail and into any additional frame;

determining said maximum available distance; and determining from said maximum available distance, the number of said frames.

10. A method for self-calibrating an automated system having at least one removable system component, said removable system component located at an expected location of said automated system and having a calibration mark, said automated system comprising at least one movable sensor, said method comprising the steps of:

said automated system moving said at least one movable sensor to sense the presence or absence of said at least one removable system component at substantially said expected location of said removable system component; and subsequently, said automated system operating said at least one movable sensor to calibrate at least one relative position of said movable sensor with respect to said calibration mark.

11. The method of claim 10, wherein said automated system additionally comprises a movable actuator for interacting with respect to said at least one removable system component having a calibration mark; and wherein said method additionally comprises the step of calibrating a position relationship between said movable actuator and said at least one movable sensor, whereby said calibration of said movable sensor with respect to said calibration mark allows accurate alignment between said movable actuator and said at least one removable system component.

12. The method of claim 11, wherein said at least one removable system component each comprises a sensible identifier at said removable system component; and wherein said step of said automated system sensing said removable system component comprises said automated system moving said movable sensor to sense said sensible identifier at said substantially expected location of said removable system component.

13. A self-configuring automated system comprising:

at least one frame;

a plurality of removable system components mounted in said at least one frame;

a system identifier for identifying said automated system;

at least one sensor for sensing said system components and for sensing said system identifier of said automated system;

a memory for storing configuration data, said configuration data having a system identifier; and at least one processor coupled to said at least one sensor and to said memory, said processor:

determining whether said configuration data is available;

if said configuration data is available:

reading said system identifier of said configuration data;

operating said sensor to sense said system identifier of said automated system;

comparing said read and said sensed system identifiers; and if said compared system identifiers match, ending said self-configuration; and if any of said configuration data availability determination, and said system identifier comparison, fails, operating said sensor to sense said removable system components, configuring said automated system.

14. The self-configuring automated system of claim 13, wherein said removable system components are located at expected locations of said automated system; wherein said at least one sensor is movable; and wherein said processor operates said sensor to sense said removable system components by causing said movable sensor to move and sense the presence or absence of said removable system components at substantially said expected locations of said removable system components.

15. The self-configuring automated system of claim 13, wherein said system identifier of said automated system is mounted at said frame, and said automated system sensor comprises a movable sensor; and wherein said processor operates said movable sensor to move and sense said system identifier at said frame.

16. The self-configuring automated system of claim 15, additionally comprising a rail for mounting said movable sensor, said rail extending from one frame into any additional frame; and wherein said processor operates said movable sensor to move along said rail to a maximum available distance and into any additional frame, said processor determining said maximum available distance, and said processor determining from said maximum available distance the number of said frames.

17. The self-configuring automated system of claim 16, wherein said automated system comprises a plurality of said frames; and wherein said processor operates said movable sensor to move to a predetermined location at a predetermined one of said frames to sense said system identifier.

18. The self-configuring automated system of claim 17, wherein said system identifier comprises a bar code label, and said movable sensor comprises a bar code reader.

19. The self-configuring automated system of claim 16, comprising a data storage library having a plurality of said removable system components mounted in said at least one frame, said removable system components comprising at least one rack of storage slots, and at least one data storage drive, each mounted at expected locations in said at least one frame; and additionally comprising a movable actuator coupled to said processor for moving said at least one movable sensor to said expected locations for sensing said system components and for sensing said system identifier.

20. A self-configuring automated system comprising:

a plurality of removable system components mounted in said automated system and located at expected locations of said automated system, each said removable system component comprising a sensible identifier at said removable system component;

at least one movable sensor for sensing said system components of said automated system; and at least one processor, said processor operating said movable sensor to move and sense said sensible identifiers at said substantially expected locations of said removable system components, thereby configuring said automated system.

21. The self-configuring automated system of claim 20, wherein at least one of said removable system components comprises a calibration mark, and said automated system comprises a movable calibration sensor coupled to said processor; and wherein said processor, subsequent to sensing said removable system components, operates said movable calibration sensor to calibrate at least one relative position of said movable calibration sensor with respect to said calibration mark.

22. The self-configuring automated system of claim 21, wherein said automated system additionally comprises a movable actuator coupled to said processor for interacting with respect to said at least one removable system component having a calibration mark, said movable actuator mounting said calibration sensor; and wherein said processor additionally operates said calibration sensor to calibrate a position relationship between said movable actuator and said movable calibration sensor, whereby said calibration of said movable calibration sensor with respect to said calibration mark allows accurate alignment between said movable actuator and said at least one removable system component.

23. The self-configuring automated system of claim 20, additionally comprising at least one frame and a rail for mounting said movable sensor, said rail extending from one frame into any additional frame; and wherein said processor operates said movable sensor to move along said rail to a maximum available distance and into any additional frame, said processor determining said maximum available distance, and said processor determining from said maximum available distance the number of said frames.

24. The self-configuring automated system of claim 20, wherein said removable system component sensible identifiers comprise bar code labels, and said movable sensor comprises a bar code reader.

25. The self-configuring automated system of claim 24, comprising a data storage library having a plurality of said removable system components mounted in said at least one frame, said removable system components comprising at least one rack of storage slots, and at least one data storage drive, each mounted at expected locations in said at least one frame; and additionally comprising a movable actuator coupled to said processor for moving said at least one movable sensor to said expected locations for sensing said sensible identifiers of said removable system components.

26. A self-calibrating automated system comprising:

at least one removable system component, said removable system component located at an expected location of said automated system and having a calibration mark;

at least one movable sensor; and at least one processor coupled to said at least one movable sensor, said processor:

operating said at least one movable sensor to move to substantially said expected location of said removable system component and sense the presence or absence of said at least one removable system component at substantially said expected location; and subsequently, operating said at least one movable sensor to calibrate at least one relative position of said movable sensor with respect to said calibration mark.

27. The self-calibrating automated system of claim 26, additionally comprising a movable actuator for interacting with respect to said at least one removable system component having a calibration mark; and wherein said processor additionally comprises operating said at least one movable sensor to calibrate a position relationship between said movable actuator and said movable sensor, whereby said calibration of said movable sensor with respect to said calibration mark allows accurate alignment between said movable actuator and said at least one removable system component.

28. The self-calibrating automated system of claim 27, wherein said at least one removable system component each comprises a sensible identifier at said removable system component; and wherein said processor operates at least one movable sensor for sensing said sensible identifier of said removable system component, moving said movable sensor to substantially said expected location of said removable system component.

29. The self-calibrating automated system of claim 28, comprising a data storage library having a plurality of said removable system components mounted in said at least one frame, said removable system components comprising at least one rack of storage slots, and at least one data storage drive, each mounted at expected locations in said at least one frame; and additionally comprising a movable actuator coupled to said processor for moving said at least one movable sensor to said expected locations for sensing said calibration marks of said system components.

30. The self-calibrating automated system of claim 29, wherein said calibration mark comprises a precisely located and precisely sized mark, and wherein said at least one movable sensor comprises a directional illumination source.

31. The self-calibrating automated system of claim 30, additionally comprising a calibration mark mounted on one of said frames precisely located with respect to said movable actuator, allowing said processor to operate said at least one movable sensor to calibrate said position relationship between said movable actuator and said movable sensor.

* * * * *